April 26, 1966 J. H. SEARCY 3,248,483

SERIES GATE DRIVER CIRCUIT FOR LOW-LEVEL MULTIPLEXER

Filed June 20, 1962 2 Sheets-Sheet 1

INVENTOR
John H. Searcy

BY
Stevens, Davis, Miller & Mosher
ATTORNEYS

INVENTOR
John H. Searcy
BY
Stevens, Davis, Miller & Mosher
ATTORNEYS

United States Patent Office 3,248,483
Patented Apr. 26, 1966

3,248,483

SERIES GATE DRIVER CIRCUIT FOR LOW-LEVEL MULTIPLEXER

John H. Searcy, Fort Lauderdale, Fla., assignor to Systems Engineering Laboratories, Inc., Fort Lauderdale, Fla., a corporation of Florida Filed June 20, 1962, Ser. No. 203,834
15 Claims. (Cl. 179—15)

The present invention relates to multiplex systems and more particularly to a series gate driver circuit for a low-level time division multiplex system.

This invention relates to low-level time division multiplex systems as set forth in application Serial No. 140,470 filed September 25, 1961, for Low-Level Multiplex System With Independently Variable Gain on Each Channel, of David C. Yoder and John H. Searcy, and application Serial No. 140,469 now Patent No. 3,070,663 filed September 25, 1961, for Gating Circuit for Low-Level Multiplex System, of John H. Searcy, both applications incorporated herein by reference. It has been observed that as more channels are added to such systems, the stray capacity of the additional wiring and circuitry common to all the channels on the output line increases producing an undesirable effect. The increase in stray capacity is objectionable since it may act to cause cross-talk between channels, or to lower the input impedance to the common line.

The problem of capacity build up is especially bad in a double-pulse multiplexer which uses a transformer on each of the multiplex channels. Conventional practice is to connect the series gate to the ground side of the secondary of the transformer because of ease of drive as shown in FIGURE 1. With this arrangement, the stray capacity between the secondary winding of the output transformer and the secondary shield is placed on the common output line. Therefore, special care is required in transformer design and construction to hold the stray capacity to a minimum.

It has been discovered that stray capacity at the secondary of the transformer can be materially reduced by winding the secondary in bifilar form and by locating the series gate at the upper or "hot" end of the secondary winding. The transformer capacity, therefore, is isolated from the common output line, and the only capacity remaining on the common output line will be that capacity due to the series gate which is small in comparison.

Hence, it is an object of the present invention to provide a series gate driver circuit for a low-level multiplex system which materially reduces cross-talk between the channels.

It is a further object of this invention to provide a series gate driver circuit for a low-level multiplex system having substantially constant input impedance.

It is a still further object of this invention to provide a series gate driver circuit for a low-level multiplex system having a minimum amount of stray capacity at the common output line.

It is a still further object of this invention to provide a series gate driver circuit for a low-level multiplex system which substantially eliminates magnetizing effects in the output transformer by using a bifilar winding for the secondary of the coupling transformer.

The above objects, features and advantages of the present invention as well as others will become apparent upon consideration of the following detailed description of one specific embodiment of the present invention, especially when taken in conjunction with the accompanying drawings, wherein.

Figures 1, 3:
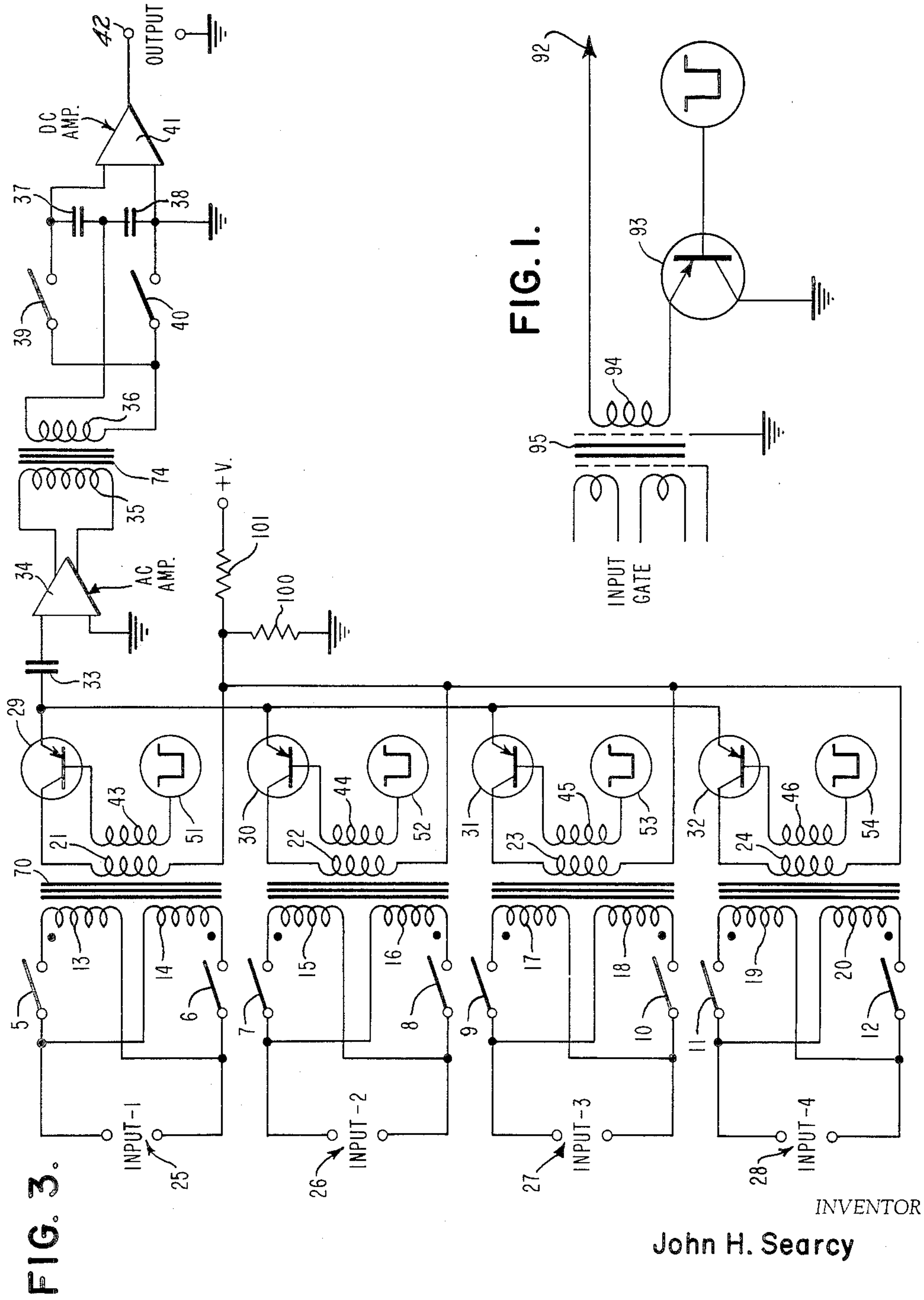
FIGURE 1 is a schematic diagram of a conventional series gate circuit.
FIGURE 3 is a schematic diagram of a low-level multiplex system utilizing the series gate driver circuit in accordance with the present invention.

FIGURE 1 shows a conventional series gate circuit arranged to transmit the signals on one multiplex channel to a common output 92. A coupling transformer is used with the "hot" side of the secondary 94 connected directly to common output 92 and the ground side of secondary 94 connected via a switching transistor 93. Energization of the transistor 93 is effected by placing a driving pulse on its base electrode making it conductive and providing a path from the common output line 92 through the secondary winding 94 of the transformer 95 to ground. In circuits of this type, stray capacity of the secondary winding 94 of the transformer 95 to the secondary shield thereof is placed on the common output line 92.

Figure 2:
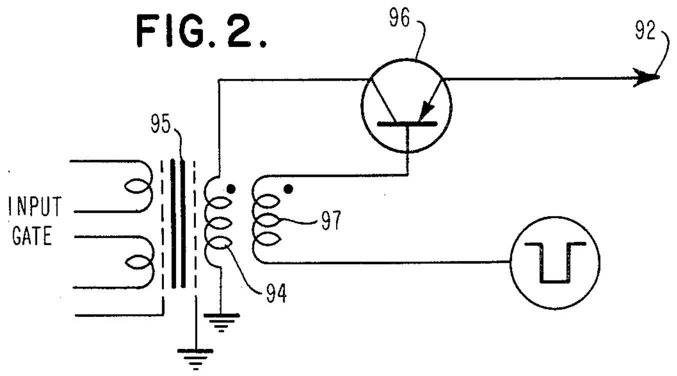
FIGURE 2 is a schematic diagram of the series gate driver circuit according to the present invention.

Figure 2 is a schematic diagram of a series gate driver circuit as connected to one output multiplex channel in accordance with the present invention. In accordance with the novel embodiment of the present invention, a transistor switch 96 is coupled between the common output line 92 and the "hot" side of the secondary winding 94 of the transformer 95. The windings 94 and 97 are wound in bifilar relation and because of this definite advantages are obtained. By placing the switch between the "hot" end of the output transformer secondary 94 and the common output line 92, the transformer capacity is isolated from the common output line. The only capacity remaining is that due to the series gate 96 which is small compared to the transformer capacity.

Base current for the series gate travels through the secondary winding 97, but does not cause any magnetizing effect in the transformer 95 since current flows in opposite directions in each secondary winding.

In FIGURE 3, the preferred embodiment of the series gate driver circuit embodied in a time division multiplex system is set forth in detail. This system includes four identical signal channels 25, 26, 27 and 28, each of which is connected to a low-level input signal source designated as input 1, 2, 3 and 4, respectively. The input signal sources 1, 2, 3 and 4 may be thermocouples or similar low-level signal producing means. Each channel is connected to two single-pole, single-throw switches such 5 and 6 in channel 25, 7 and 8 in channel 26, 9 and 10 in channel 27 and 11 and 12 in channel 28.

The input signal path in the channel 25 can be traced from the first line of input 1, through the switch 5, the primary winding 13 of the transformer 70 and back to the second line of the input source. A second circuit path can be traced from the first line on th einput 1 through the primary winding 14 of transformer 70, the switch 6 and back to the second line of input 1. The primary windings 13 and 14 are wound in opposition to each other. The switches 5 and 6 are sequentially activated to cause signal current flow alternately into one and then the other of the primary windings 13 and 14.

Channels 26, 27 and 28 respectively, operate in the same manner, by means of the switches 7 and 8 and the primary windings 15 and 16 in channel 26; by means of switches 9 and 10 and the primary windings 17 and 18 in the channel 27; and by means of the switches 11 and 12 and the primary windings 19 and 20 in the channel 28. The switches 5, 6; 7, 8; 9, 10; and 11, 12 are sequentially operated by a suitable device (not shown).

The polarity of the primary windings 13, 14; 15, 16; 17, 18; and 19, 20 are such that a flux reversal occurs whenever the second of each of these pairs of windings is energized causing an alternating signal to appear in the secondary windings 21, 22, 23 and 24 of the transformers. These signals in the secondary windings are coupled to a common A.-C. amplifier 34 through a coupling capacitor 33 by the closure of switches 29, 30, 31 and 32, each of which could be preferably a transistor. Each of the transistors 29, 30, 31 and 32, respectively, has connected to its base electrode a winding 43, 44, 45 and 46, respectively, in series with a drive source 51 to 54, respectively. Each of the windings 43, 44, 45 and 46 is wound in bifilar form with its corresponding secondary winding 21, 22, 23 and 24. Base current for the transistors 29, 30, 31 and 32 passes through the windings 43–46 in a direction opposite to that of the corresponding secondary windings 21–24, thereby substantially eliminating any magnetizing effects in the transformer.

The IR drop in the winding carrying the collector current in each of the transistors to ground adds to the pedestal of the series gate circuit and can overload the amplifier if allowed to become excessively large and cause linearity problems. This IR drop can be cancelled in each channel by a voltage of opposite polarity which is introduced in series with the common return of each of the series gates or switches 29–32. This cancellation is accomplished by coupling each of the secondary windings 21–24 to ground through a resistor 100 and to a source of positive potential through a second resistor 101. The value of the resistors 100 and 101 is selected to provide the necessary cancelling voltage.

The output signal from the A.-C. amplifier 34 is applied to the primary winding 35 of the transformer 74. This signal is transferred to the secondary winding 36 of the transformer 74 and is then switched alternately across the capacitors 37 and 38 at times to coincide with the switching action of the input transistor switches. This switching is accomplished by means of the alternate closure of the switches 39 and 40 in synchronism with the switches 5 and 6 in the case of input channel 1, and for the corresponding switches in the remaining channels according to the timing diagram in FIGURE 4. These capacitors (37 and 38) function as a holding or storage device for the A.-C. signals applied thereto.

Accordingly, switches 39 and 40 and capacitors 37 and 38 serve as a synchronous rectifier for the A.-C. signals applied thereto. The output voltage obtained across capacitors 37 and 38 is applied to a D.-C. amplifier 41, the output of which is a time division multiplex signal of the input signals which have been amplified with negligible distortion, drift or noise. The amplifier 41 is of standard design having high input impedance and low output impedance to enhance matching to a suitable load.

Figure 4:
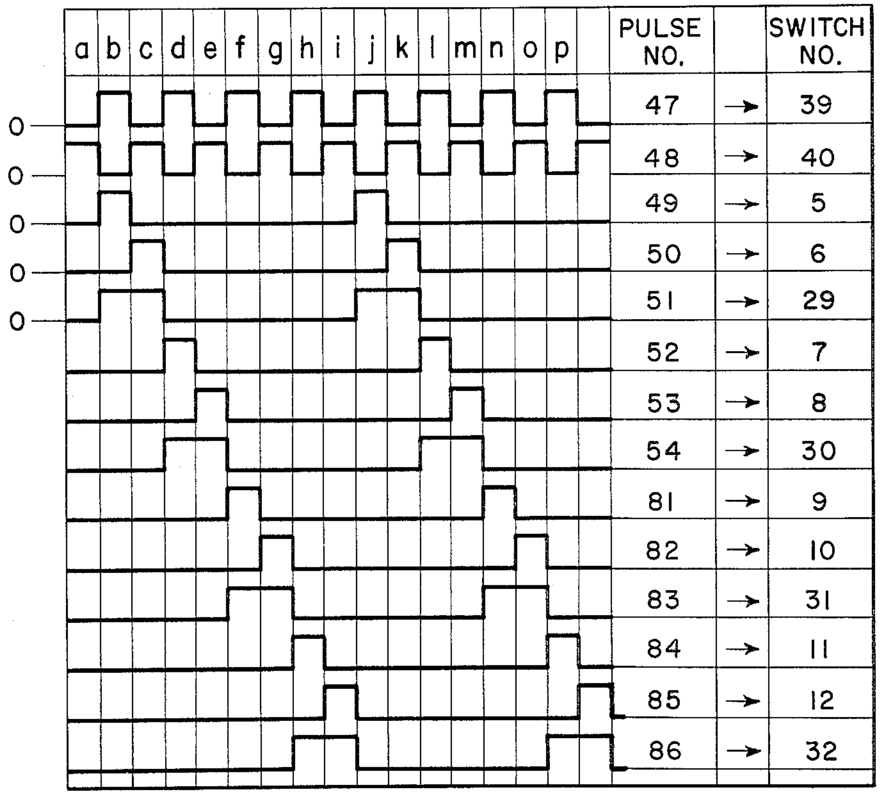
FIGURE 4 is a timing diagram associated with the schematic diagram of FIGURE 3.

The operation of the system disclosed in FIGURE 3 is best understood by reference to the timing diagram illustrated in FIGURE 4.

FIGURE 4 is a timing diagram which includes a plurality of rectangular signal pulses 47 through 54 and 81 through 86. A positive going signal pulse in the timing diagram will indicate the closure of the switch associated therewith as indicated in FGURE 4. The above mentioned signals are associated with switches 39, 40, 5, 6, 29, 7, 8, 30, 9, 10, 31, 11, 12, and 32, respectively.

Reference to FIGURE 4 discloses that in the time period *b* the signal 47 is positive, thereby indicating the closure of switch 39. Also, the signals 49 and 51 are positive, thereby indicating the closure of switches 5 and 29. During this time period an input signal pulse will travel through the switch 5, the primary winding 13 and back to the second terminal of the input 1. A signal pulse will thereby be placed on the secondary winding 21 of the transformer 70, the secondary winding having been connected to ground through resistor 100 at one end and to the commmon output line through the switch 29 at its other end. This signal travels through the switch 29 and the coupling capacitor 33 to the A.-C. amplifier 34 wherein it is amplified and transferred to the primary winding 35 of the transformer 74.

The signal at the primary winding 35 will be passed to the secondary winding 36 and charge the capacitor 37, the switch 39 having been closed during time period *b*.

During the time interval *c*, the switches 40, 6 and 29 will be closed, the remaining switches being held open. Accordingly, an input signal will travel from the input 1 to the primary winding 14, through the switch 6 and back to the second terminal of the input 1. This signal will be of opposite polarity to the signal at the input of the transformer 70 during the time period *b* due to the direction of the windings 13 and 14. The signal is transferred to the secondary winding 21, one terminal of which has been coupled to ground through the resistor 100, the signal passing through the switch 29 and the coupling capacitor 33 to the A.-C. amplifier 34 and then to the primary winding 35 of the transformer 74. The signal is then transferred to the secondary winding 36 and charges the capacitor 38 through the closed switch 40. It should be noted that in time period *c* the voltage across the secondary winding 36 will be of opposite polarity to the voltage across the line 36 during the time interval *b*. Therefore, the capacitor 38 will be charged in a direction opposite to that of capacitor 37. Accordingly, the voltage across the two capacitors will be the combination of the two input voltage signals in the time intervals *b* and *c*. This voltage is then transferred through the D.-C. amplifier 41 to the output terminal 42. Similarly, during the remaining time periods as set forth in FIGURE 4, the remaining switches will be sequentially opened and closed, thereby producing a time division multiplex output signal at the output terminal 42.

It should be understood that though the switches 5 to 12, 39 and 40 have been described as single-pole, single-throw switches, the switches could be, for example, transistors acting as switches wherein the transistors are rendered conductive by timing pulses on the control electrode thereof during the time periods indicated in FIGURE 4 in which the switches are open. A typical transistor switch which can be used with this invention is set forth in copending application Serial No. 140,469 mentioned supra.

Though the invention has been described with respect to a specific embodiment, many variations will be obvious to those skilled in the art. Accordingly, it is the intention to be limited only as indicated by the scope of the appended claims which are to be interpreted as broadly as possible in view of the prior art.

What is claimed is:

1. A time division multiplex system comprising a plurality of input channels, an output channel and means for sequentially connecting each of said input channels to said output channel, said means including a transformer in each channel having a primary winding coupled across said input channel and secondary winding having a first and second terminal, a source of reference potential coupled to said first terminal of each of said secondary windings and a sequentially operated switch means in each channel coupling said second terminal of said secondary windings to said output channel for transferring an input signal to said output channel when said switch means is closed and isolating said transformer from said output channel when said switch means is open, each said switch means comprising a transistor having an input electrode, an output electrode and a control electrode, a pulse source associated with each said switch means and a coil coupling each said control electrode with its associated pulse source, said coil being wound in bifilar relationship with said secondary winding in its associated channel.

2. A time division multiplex system comprising a plurality of input channels, an output channel and means for sequentially connecting each of said input channels to said output channel, said means including a transformer in each channel having a primary winding coupled across said input channel and a secondary winding having a first and second terminal, a source of reference potential coupled to said first terminal of each of said secondary windings and a sequentially operated switch means in each channel coupling said second terminal of said secondary windings to said output channel for transferring an input signal to said output channel when said switch means is closed and isolating said transformer from said output channel when said switch means is open, each said switch means comprising a transistor having an input electrode, an output electrode and a control electrode, a pulse source associated with each said switch means and a coil coupling each said control electrode with its associated pulse source, and said coil being inductively coupled to said secondary winding in its associated channel.

3. A time division multiplex system as set forth in claim 2 wherein said coil is wound in bifilar relationship with its associated secondary winding.

4. A time division multiplex system as set forth in claim 1 wherein each of said coils and its associated secondary winding are oriented to cancel magnetizing effects in each of said transformers.

5. A time division multiplex system as set forth in claim 2 wherein each of said coils and its associated secondary winding are oriented to cancel magnetizing effects in each of said transformers.

6. A time division multiplex system as set forth in claim 3 wherein each of said coils and its associated secondary winding are oriented to cancel magnetizing effects in each of said transformers.

7. A coupling system comprising an input channel, an output channel and means for periodically connecting said input channel to said output channel, said means including a transformer having a primary winding and a secondary winding, a switch coupled to said secondary winding and to said output channel, said switch including an input electrode, an output electrode and a control electrode, a pulse source associated with said switch and a coil coupling said control electrode with its associated pulse source for reducing magnetizing effects when said pulse source and said secondary winding are energized.

8. A coupling system as set forth in claim 7 wherein said coil is wound in bifilar relationship with said secondary winding.

9. A coupling system as set forth in claim 7 wherein said coil is inductively coupled to said secondary winding.

10. A coupling system as set forth in claim 9 wherein said coil is wound in bifilar relationship with said secondary winding.

11. A coupling system as set forth in claim 8 wherein said coil and said secondary winding are oriented to cancel magnetizing effects in said transformer.

12. A coupling system as set forth in claim 9 wherein said coil and said secondary winding are oriented to cancel magnetizing effects in said transformer.

13. A coupling system as set forth in claim 10 wherein said coil and said secondary winding are oriented to cancel magnetizing effects in said transformer.

14. A time division multiplex system as set forth in claim 1 wherein said source of reference potential includes means for providing a voltage signal substantially equal and opposite to the voltage drop in said secondary winding.

15. A coupling system as set forth in claim 11 further including means coupled to said secondary winding for providing a voltage signal substantially equal and opposite to the voltage drop in said secondary winding.

References Cited by the Examiner

UNITED STATES PATENTS

| | | | |
|---|---|---|---|
| 2,936,338 | 5/1960 | James et al. | 179—15 |
| 2,954,531 | 9/1960 | Johnson | 336—181 |
| 3,013,162 | 12/1961 | Antista | 307—88.5 |
| 3,060,267 | 10/1962 | Fedar | 179—15 |
| 3,089,921 | 5/1963 | Hines | 179—15 |

DAVID G. REDINBAUGH, *Primary Examiner.*